United States Patent

Stevens

[15] 3,637,410
[45] Jan. 25, 1972

[54] METHOD OF TREATING CATHODO-LUMINESCENT PHOSPHORS

[72] Inventor: Gary L. Stevens, 1631 Vine, Norman, Okla. 73069

[22] Filed: Dec. 18, 1968

[21] Appl. No.: 784,860

[52] U.S. Cl....................................117/8, 117/33.5, 117/46
[51] Int. Cl..........................................................H01j 31/20
[58] Field of Search .................117/33.5 C, 33.5 CM, 33.5 A, 117/46 CA, 46 FA, 8

[56] References Cited

UNITED STATES PATENTS 3,560,258  2/1971  Brisbane..........................117/93.3 X
3,236,707  2/1966  Lins...................................96/36.2 X Primary Examiner—Alfred L. Leavitt
Assistant Examiner—Wayne F. Cyron
Attorney—Dunlap, Laney, Hessin & Dougherty

[57] ABSTRACT

A method of treating an expanse of phosphor material to remove selected spots which have interfering luminescent properties. The method consists of isolating and identifying spots or areas considered to be objectionable as regards the desired function of the particular phosphor, and then focusing a laser beam of selected wavelength at each spot whereupon the phosphor material absorbs the laser generated radiant energy to develop heat energy sufficient to effect vaporization of the spot of phosphor material.

8 Claims, 3 Drawing Figures

PATENTED JAN 25 1972

3,637,410

INVENTOR.
GARY L. STEVENS
BY
Dunlap, Laney & Hessin
ATTORNEYS 3,637,410

METHOD OF TREATING CATHODO-LUMINESCENT PHOSPHORS

BACKGROUND OF THE INVENTION

1. Field of the Invention

The invention relates generally to a method of treating phosphor materials and, more particularly, but not by way of limitation, it relates to a method of removing objectionable spots from the phosphor screen of cathode ray-type vacuum tubes.

2. Description of the Prior Art

The prior art includes no such methods for correcting the existence of objectionable spots in a cathode ray tube phosphorous screen. There have been instances, in production of certain cathode ray tubes having very exact properties and capabilities, where tube failure rates at production have been extremely high due to the difficulty of controlling uniformity of the phosphor screen. Also, there is a major problem as to electron flooding of a particular spot due to nonuniformity in the dielectric storage grid. In recognizing the nature of the problem, it has generally been assumed that better manufacturing environmental control and a state of the art improvement in dielectric grid processing is required. With regard to the problem in connection with direct view storage tubes, certain difficulties in the form of uneven phosphorescence resulting in dark and bright spots has been traced to impurities and/or nonuniformity of the dielectric material of the storage screen. The problems contained here in outline have not yet been overcome to a sufficient degree by any of the prior endeavors.

SUMMARY OF THE INVENTION

The present invention contemplates a method for treating phosphor materials whereby the objectionable luminescence and phosphorescence characteristics of the phosphor viewing screen are eliminated. In a more limited aspect, the invention consists of the use of a laser equipment to vaporize selected areas of a phosphor screen material, those areas which give rise to objectionable brightness characteristics of luminescence and phosphorescence. The laser equipment is focused on an area or spot of a phosphor material and then it is pulsed to deliver sufficient power to vaporize the phosphor at that minute focal point.

Therefore, it is an object of the present invention to provide a laser irradiation method which will greatly reduce the cost of manufacturing certain forms of cathode ray vacuum tubes.

It is also an object of the invention to provide a method which can be performed on the finished or manufactured cathode ray vacuum tube to effect phosphor correction without harming other internal components of the vacuum tube.

Finally, it is an object of the present invention to provide a method for insuring brightness uniformity of cathode ray tube viewing screens, which method is performed inexpensively to effect great saving in the manufacturing cost of such tubes.

Other objects and advantages of the invention will be evident in the following detailed description when read in conjunction with the accompanying drawing which illustrates the invention.

DETAILED DESCRIPTION OF THE INVENTION

Figure 1:
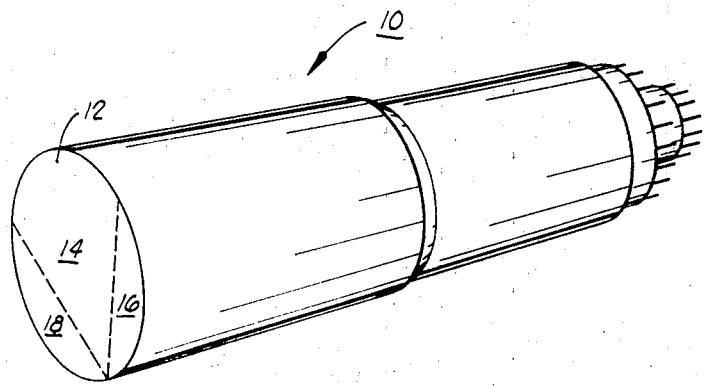
FIG. 1 is a perspective view of one form of cathode ray vacuum tube which gains particular advantage from the present invention.

While there are various forms of cathode ray tubes which employ a phosphor viewing screen, and which tubes may particularly benefit from processing in accordance with the present invention, a vacuum tube 10 of the type shown in FIG. 1 is afforded particular benefit. The vacuum tube 10 is a well-known form of direct view storage tube which finds particular utility in certain surveillance and plotting applications. For example, the vacuum tube 10 may be a display storage tube of the type used in radar displays which permits direct display of target information against a nonilluminated background.

The employ of vacuum tube 10 in such highly critical radar displays necessitates very rigid standards as to uniformity of the viewing screen and, therefore, as to the phosphor material which provides the necessary light variation. Due to certain impurities and irregularities in the storage grid, certain dark spots and bright spots may appear on the tube face 12. Dark spots may be defined as areas of the screen which do not brighten during writing or which require unusual processes to effect brightening. This will also include areas which lack persistence or whose persistence, to an observer, is obviously less than that of surrounding areas. Bright spots exist as portions of the tube face 12 which becomes excessively bright, and they may be difficult to erase, unerasable, and/or they may be sufficiently large to interfere with target interpretation. Dark spots are not necessarily objectionable while bright spots are objectionable in that they can always convey false or interfering target information in addition to reducing visual activity from overstimulation of the eye.

Elimination of all bright spots in manufacture has proven to be extremely difficult such that display tubes such as tube 10 are generally accepted at a reduced but sufficiently qualified standard. Thus, one standard which is employed in the industry requires that a most critical tube zone 14 (FIG. 1) may have as many as two bright spots so long as their diameter is equal to or less than 0.030 inches with a minimum of ½-inch separation; and secondary zones 18 and 16 may have as many as four total bright spots equal to or less than 0.030 inches with a minimum of ½-inch separation; and secondary zones 18 and 16 may have as many as four total bright spots equal to or less than 0.030 inches so long as a minimum separation of one-quarter inch is present.

A greater number of bright spots in any of primary zone 14 or secondary zones 16 and 18, or inclusion of one or more bright spots greater than 0.030 inches diameter, would necessitate rejection of the vacuum tube 10. Dark spots are also objectionable, however, this is not critical and much larger diameter spot size in greater numbers can be allowed without a rejection of the vacuum tube 10 from its intended employment. It should be noted that such rejection standards with regard to bright spots are extremely rigid and result in acceptance of only about one vacuum tube 10 out of every six tested, an extremely high failure rate for a very expensive vacuum tube.

The foregoing discloses a test which is employed only in one specific instance to test one particular type of direct view storage tube. It should be borne in mind that various standards with respect to many different types of cathode ray tubes employing the cathodo-luminescent display function will exist in other areas of technology, and it should be understood that each such tube type can avail itself of the present method for insuring uniformity of display screen characteristics. For example, the present laser radiation method may be employed with the common type of viewing cathode ray tube to remove areas of the phosphor material which luminesce to an undesired brilliance thus causing quality control rejection.

Figure 2:
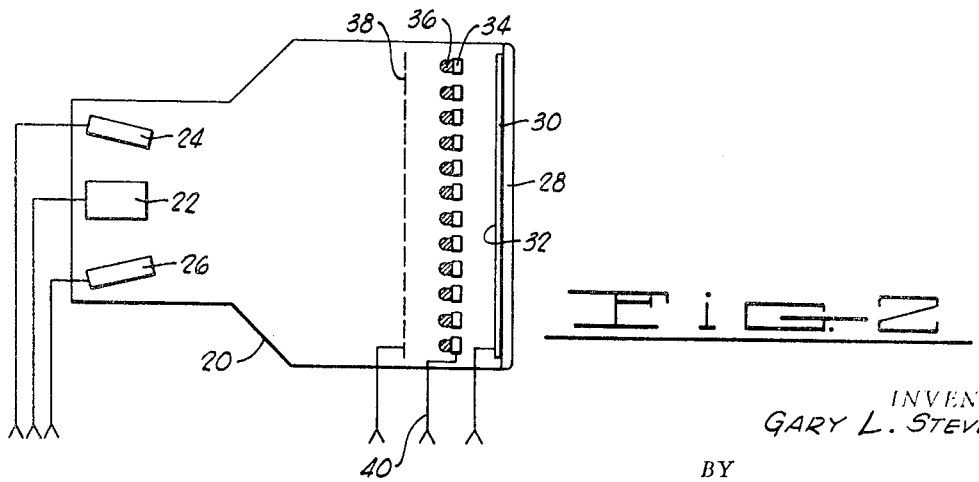
FIG. 2 is a schematic diagram of the cathode ray tube of FIG. 1, a direct view storage type of tube.

The schematic diagram of FIG. 2 represents a direct view storage tube 20 which includes a plurality of electron guns, a flood gun 22 and a pair of writing guns 24 and 26. Direct viewing is enabled at the tube face through an optical glass viewing face 28 bearing a phosphor 30 on its inner or reverse side. A very thin and reflective metallic layer 32, e.g., aluminum, is then deposited on the phosphor material 30. Storage capability is provided by a very fine mesh metallic screen 34, e.g., on the order of 500 per inch, fifty percent open mesh screen. The screen 34 is made to have a suitable dielectric material 36 deposited uniformly on one side thereof, e.g., as by conventional sputtering techniques.

A secondary electron collector grid 38 is disposed further to the rear of storage screen 34. The vacuum tube 20 is a type similar to that of FIG. 1, a direct view storage tube, wherein images stored (as by electronic scanning elements not shown) on the storage screen 34 and is associated dielectric coating 36 may be transferred to the front viewing screen by energization of the flood gun 22 to project an electron pattern through storage screen 34 in accordance with admission as permitted by the charge of dielectric material 36. Thus, the flooding electrons impinge through the aluminized layer 32 to bring about cathodo-luminescence in the phosphor layer 30 to display a visible image of the electronically stored pattern or scene. The image resulting from the aggregate luminescence and subsequent phosphorescence may be viewed through the glass face 28 by the operator or whatever.

A check for bright spots can be effected by energizing write guns 24 and/or 26 to bring about saturation at the viewing screen. A selected erase pulse input at lead 40 may then be applied to effect threshold visual cutoff as viewed through the front glass face 28; and, thereafter, upon removal of the erase pulse energization at lead 40, there should be no area visible which exceeds a certain measured amount of saturation respective of a selected period of time. The exact requirement of such saturation testing may vary with the exigencies of each particular application.

Once bright spots have been identified on tube face 28, laser equipment can be operated directly into the tube face 28 to effect vaporization of the phosphor material 30 in the area of those selected bright spots thereby to render the overall luminescence of the layer of phosphor material 30 more uniform across its expanse. As laser focus is brought forward through tube face 29 to approach the selected spot of phosphor material 30, laser energy will cause heat build up of absorbtive phosphor material 30 until vaporization is effected. Laser energy is transmitted through tube face 28 and therefore causes no damage as will be further described below.

Figure 3:
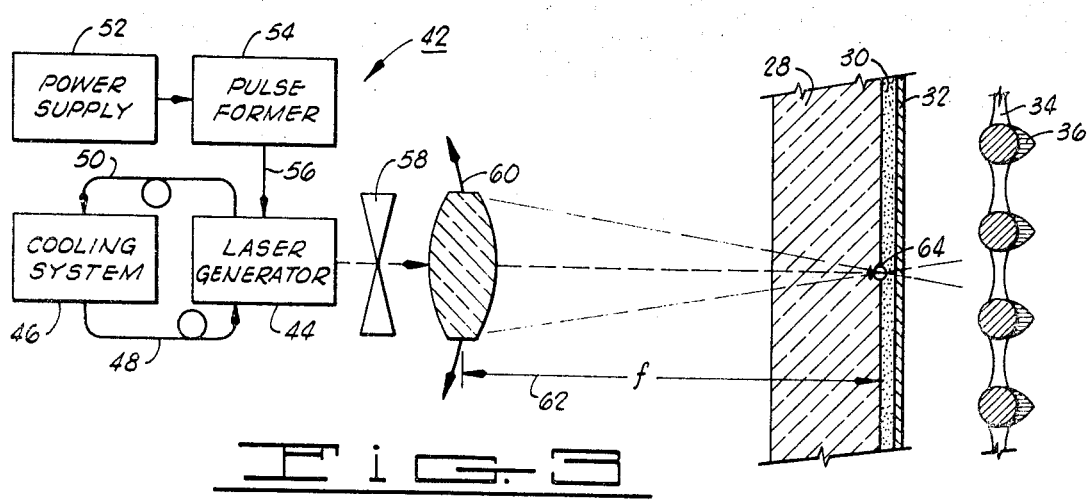
FIG. 3 is a functional diagram of the method of the invention in operation to effect uniformity of a phosphor coated cathode ray tube viewing screen.

FIG. 3 shows the laser irradiating procedure in greater detail with a tube face 28, phosphor material layer 30, metallic layer 32, and an associated storage screen 34 all shown in much enlarged cross section. A laser system 42 of conventional type would consist of a laser generator 44 which is heat controlled by a cooling system 46 and coolant flow lines 48 and 50 connected for circulation therebetween. A suitable power supply 52 may be utilized to supply electrical power input to a pulse forming network 54 which provides pulse energization via a lead 56 to the laser generator 44. The laser system 42 may also use conventional types of aperture control 58 and adjustable optics 60. The adjustable optics 60 may be variably adjustable, especially as to focal length $f$, designated as arrow line 62.

The laser system 42 may be any of various commercially available lasers of the pulsed, relatively low-power variety. A laser beam emanating from any of the foregoing laser systems would be transmitted through the glass tube face as would laser systems having as host any of helium-neon, argon ion, and nitrogen gas.

A suitable form of laser may be selected from various of the commercial laser equipments available from the Westinghouse Electric Corporation of Pittsburgh Pa. A proper equipment can be selected from consideration of operating characteristics such as directivity, total energy output; wave length and pulse duration. Thus, a Westinghouse model LMT-21 pulsed laser system emanating laser output at a wave length of 6,943 angstroms can provide an energy output of at least 30 joules. To select a typical application wherein To phosphor such as zinc sulphide activated with copper is irradiated for bright spot removal, the available absorbed energy would be approximately eight hundred times the required energy to elevate a minimal spot of the phosphor to its vaporization temperature. It is apparent then that less powerful systems may be employed to minimize expense, and still more efficiency can be gained with proper selection of the laser-pulsing equipment, particularly wavelength.

In irradiating a selected bright spot as shown in FIG. 3, the vacuum tube can be energized to render bright spots visible whereupon the laser lens 60 may be utilized for isolation and lining up of the laser with a selected bright spot. Thereafter, the laser generator 44 can be properly aligned for irradiation with laser energy. Laser energization can then follow in accordance with the proper power requirements to vaporize the minimal area of phosphor giving rise to objectionable bright spot phosphorescence. The focal length 62 may be adjusted so that the laser beam focuses at point 64, at approximately the inner face of tube face 28 and phosphor material layer 30. This adjustment will not damage the glass face 28 as the energy is transmitted through the glass of tube face 28; it will deliver maximum laser energy for absorption at an optimum point of the phosphor material layer 30. The storage screen 34 and dielectric 36 are sufficiently removed to be in a defocused position and free from deleterious effects of the laser energy. The spot size of the laser may be adjusted to suit the power density requirements of the phosphor.

In some cases it may be preferable that the removal of the bright spot be performed while the vacuum tube is activated or energized. Thus, the bright spot will be exhibited quite plainly in contrast to the surrounding background phosphor, while electron impingement of the phosphor surrounding the objectionable bright spot area will be made more resistant to vaporization. That is, due to the fact that the absorption characteristics of the phosphor are much enhanced during electron bombardment, the bright spot will absorb the laser irradition preferentially with respect to the less luminous phosphor material disposed immediately therearound. In any event, such irradiation renders the bright spot a preferential absorber with respect to surrounding phosphor material.

It is contemplated that laser energy output from a wide variety of commercially available laser systems will find a sufficient degree of absorption to vaporize any of numerous ones of the commercially available phosphor materials which are generally employed as cathodo-luminescent light sources in various ones of the viewing vacuum tubes. A mathematical consideration of phosphor absorption characteristics is as follows:

Assume that phosphor X decomposes from a solid to a vapor at $T_1$ where the specific heat $C_1(I)$ X is a function of temperature such that $$C_1(T) = a + (b \cdot 10^{-3})T + (C \cdot 10^{-6})T^2 + (d_2/T \cdot 10^5) \quad (1)$$

then, where $T_o$ equals initial temperature, $L$ equals heat of decomposition per unit mass, $r$ equals radius of phosphor spot in centimeters, $t$ equals thickness of phosphor spot in centimeters, and $R$ equals density in grams per centimeter cubed. The energy ($Q$) requirement for removal of the particular phosphor spot then becomes $$Q = R\pi r^2 t[a(T_1 - T_o) + (b \cdot 10^{-3}/2)T_1^2 - T_o^2) + (C \cdot 10^{-6}/3)$$
$$(T_1^3 - T_o^3) - d \cdot 10^5 \cdot (T_o - T_1/T_o T_1)] + LR\pi r^2 t \quad (2)$$

The energy absorbed by the phosphor is given quite simply by $$I(d) = I_o e^{-a_f d} \quad (3)$$

where $I_o$ equals the intensity or energy per centimeter squared at the surface of the phosphor, $I$ equals the intensity at a depth $d$ in the material, and $a_f$ equals the absorption coefficient at frequency $f$. The energy absorbed from the surface to a depth $d$ may then be represented by $$Q = \{I_o - I(d) \ A\}$$
$$= (I_o - I)A \quad (4)$$

or, assuming that the laser spot size D and the phosphor spot size to be removed $t$ are equal, $$Q_{absorbed} = I_o - I_o e^{-a_t d})\pi R^2 \quad (5)$$
$$Q_{absorbed} = I_o(1 - e^{-a_t d}\pi R^2 \quad (6)$$

preferably $Q_a$ (absorbed) is greater than $Q$, the required energy, and this assures compensation for any reradiated energy by the phosphor during illumination.

As a specific example, consider the following:

Let the phosphor material be ZnS:Cu; that is, a zinc sulphide material mixed with a copper activator. State the phosphor spots to be removed as being 0.010 inches in diameter with a thickness of 10 microns. It may be determined that the correct vaporization mode will cause decomposition of the zinc sulfide at about 1,270 degrees K. with a maximum energy requirement of approximately 48 calories per mole. The initial temperature $T_o$ is assumed to be 300 degrees K. such that for ZnS, $$C(T) = 12.16 + 1.24 \cdot 10^{-3}T - 1.36 \cdot 10^5 T^{-2} \quad (7)$$

the upper limit is then calculated as $$E_{required} < m[\int C_p dT + D(Me^x)] \quad (8)$$

which $$= m\left[\left(12.16T + .62 \cdot 10^{-3}T^2 + \frac{1.36 \cdot 10^5}{T}\right)\right]_{300}^{1270} + 48 \cdot 10^3 \text{ cal.gm.} \atop \text{mol.wt.} \quad (9)$$

$$E_{required} < .0053 \text{ joule} \quad (10)$$

In the case of ZnS, $a_f$ is a direct function of copper Cu concentration and it can be extrapolated for a copper concentration of one part copper to 10,000 parts ZnS as being 152 per centimeter at about 7,000 angstroms wave length. Therefore, $$E_{absorbed} = I_o(1 - e^{-a_f}) \pi r^2 \quad (11)$$

$$= 0.141 \pi r^2 I_o = (E/A) \pi r^2 (0.141) = E(0.141) \quad (12)$$

Thus, a thickness of 10 microns of ZnS:Cu (0.01% Cu) will absorb 14.1 percent of the incident energy.

For a typical laser system, such as the previously considered Westinghouse LMT-21, the pertinent output parameters will allow a pulse energy output of 30 joules at a wavelength of 6,943 angstroms and, based on the above calculation of equations (8) through (12), the energy absorbed would be $$E_{absorbed} = (0.141)(30 \text{ joules}) = 4.23 \text{ joules} \quad (13)$$

It can readily be seen that the available absorbed energy is approximate 800 times that energy required for vaporization. It is apparent too that less powerful laser systems may be used to minimize both the expense and the danger of damaging surrounding phosphor material or tube components.

As previously stated, it is contemplated that any of the various commercially employed phosphor materials may be corrected or removed in the manner of the present method; although, in some cases it may be desirable to employ a laser system having characteristic wavelength and power properties. Various phosphors in microcrystalline form are employed commercially and these include the many phosphors of zinc, zinc-cadmium sulphides, zinc silicate, various tungstates, various fluorides, all of which may be combined in varying proportions with suitable impurity activators for specific cathodo-luminescence purposes.

While copper is commonly employed as an activator it should also be noted that gold and silver can bring about the necessary substitution and perturbation to serve as activators. Still other phosphor materials employ a coactivator in the form of gallium or indium and these too are susceptible of the vaporization process of the present invention. Another group of compounds and mixtures such as the alkali halides, certain rare earths, and other organic and inorganic crystalline phosphors present sufficiently absorbtive characteristics to certain incident laser energy as to be vaporized if for some reason their cathodo-luminescent properties are objectionable.

The foregoing discloses a novel method for overcoming a serious problem which has been encountered in the manufacture of certain cathode ray vacuum tubes. As previously stated, it finds particularly utility with regard to some of the very costly direct-view storage types of tubes and other high resolution viewing tubes; large production cost savings may be effected as manufacturing costs multiply directly with the tube failure ratio of these tubes in production. The present method enables the expanse of a viewing screen to be free from deleterious effects of phosphor impurities and storage grid defects which bring about the presence of bright or brilliant spots to render the viewing tubes below standard for many designated purposes.

Changes may be made in the combination and arrangement of elements as heretofore set forth in the specification shown in the drawing; it being understood that changes may be made in the embodiments disclosed without departing from the spirit and scope of the invention as defined in the following claims.

What is claimed is:

1. A method for removing bright spots from a cathodo-luminescent, phosphor material presentation face of a cathode ray tube, comprising the steps of:
   focusing a laser beam of monochromatic, coherent light radiation on the tube face in said phosphor material at the point of the bright spot; and
   energizing the laser beam generating instrumentality at sufficient power output to remove the phosphor material from the tube face proximate the point of focus.

2. A method as set forth in claim 1 which includes the further steps of:
   repetitively moving and reenergizing the focused laser beam until all of the phosphor material causing said bright spot has been removed.

3. A method for removing bright spots as set forth in claim 1 which is further characterized in that:
   the laser beam is focused in the plane of the phosphor material or just forward thereto in the plane of the glass tube face such that no damage occurs to internal metallic tube elements.

4. A method as set forth in claim 3 in which includes the further steps of:
   repetitively moving and reenergizing the focused laser beam until all of the phosphor material causing said bright spot has been removed.

5. A method as set forth in claim 1 wherein:
   said cathode ray tube is a direct view storage tube having a relatively short persistence phosphor material.

6. A method as set forth in claim 1 wherein:
   said phosphor material is zinc sulphide with copper activator.

7. A method as set forth in claim 5 or 6 wherein:
   said phosphor material has aluminized backing.

8. A method for treating an expanse of phosphor material having randomly spaced spots of objectionable high brightness luminescence, comprising the step of:
   focusing a laser beam upon or proximate to each of said high brightness spots, said laser beam being of a wavelength which is readily absorbed by said phosphor material such that said material is vaporized.

\* \* \* \* \*